United States Patent [19]

Brunold et al.

[11] 4,269,609

[45] May 26, 1981

[54] ISOLATING FLUORINE COMPOUNDS FROM THE VAPORS OBTAINED WHEN EVAPORATIVELY CONCENTRATING PHOSPHORIC ACID

[75] Inventors: Andreas Brunold, Bobenheim-Roxheim; Peter Kroetzsch, Ketsch; Lothar Diehl, Ludwigshafen, all of Fed. Rep. of Germany

[73] Assignee: BASF Aktiengesellschaft, Fed. Rep. of Germany

[21] Appl. No.: 117,129

[22] Filed: Jan. 31, 1980

[51] Int. Cl.³ .......................................... B01D 47/00
[52] U.S. Cl. ...................................... 55/71; 423/240
[58] Field of Search ................... 55/71, 73; 423/240

[56] References Cited

U.S. PATENT DOCUMENTS

| | | | |
|---|---|---|---|
| 3,091,513 | 5/1963 | Darish | 55/71 |
| 3,512,341 | 5/1970 | English | 55/71 |
| 3,893,830 | 7/1975 | Peterson et al. | 55/240 R |
| 4,106,918 | 8/1978 | Fujikawa et al. | 55/71 |

FOREIGN PATENT DOCUMENTS 2534616  2/1977  Fed. Rep. of Germany ............. 55/71

*Primary Examiner*—Bernard Nozick
*Attorney, Agent, or Firm*—Keil & Witherspoon

[57] ABSTRACT

Fluorine compounds which are contained in the vapors obtained when evaporatively concentrating phosphoric acid are removed by scrubbing with an aqueous solution of fluosilicic acid under reduced pressure at a temperature at which condensation of steam is substantially avoided. The aqueous fluosilicic acid solutions are injected, at a speed of from 15 m/s to 40 m/s, into the upper part of a scrubbing zone, finely dispersed over the entire cross-section of the latter. The vapors are passed through the scrubbing zone at a speed of from 5 to 30 m/s, in co-current with the fluosilicic acid solutions. The residence time of the vapors in the scrubbing zone is from 0.4 to 1.5 s. The fluosilicic acid taken off the scrubbing zone contains from 20 to 28% by weight of $H_2SiF_6$.

4 Claims, 1 Drawing Figure

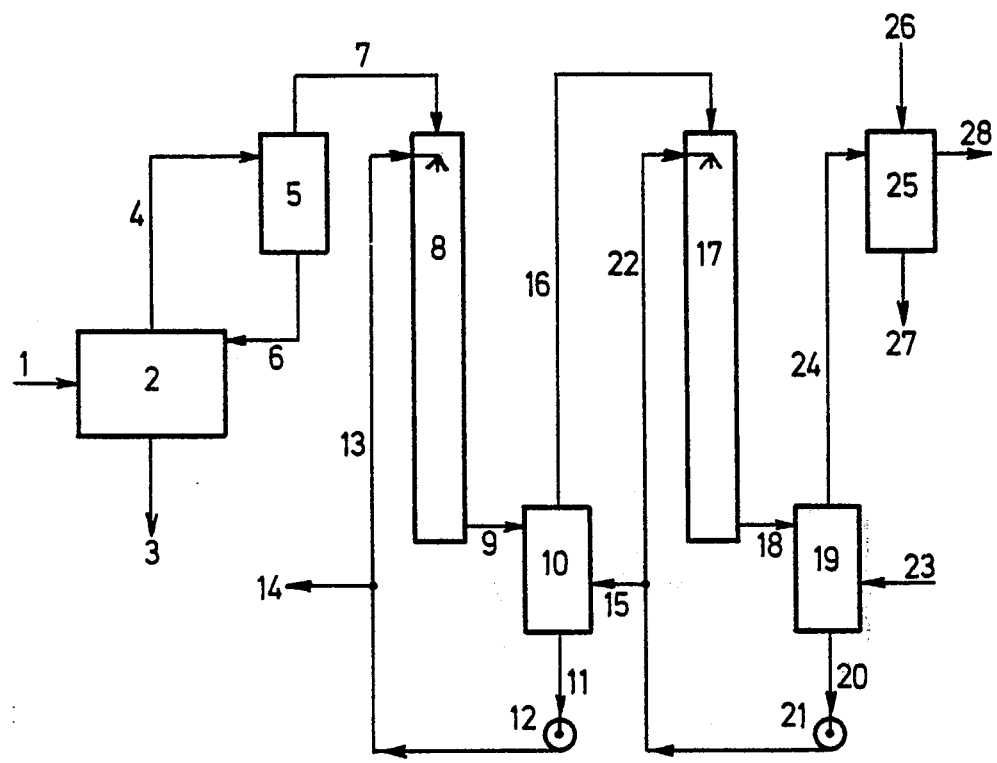

ISOLATING FLUORINE COMPOUNDS FROM THE VAPORS OBTAINED WHEN EVAPORATIVELY CONCENTRATING PHOSPHORIC ACID

The present invention relates to a process for isolating, and recovering, fluorine compounds from the vapors obtained when evaporatively concentrating phosphoric acid.

In the preparation of phosphoric acid by the wet process, raw phosphates are treated with mineral acids, especially with sulfuric acid, and the phosphoric acid obtained, which is of about 30% strength by weight, is concentrated to about 55% strength by weight under reduced pressure. The fluorides contained in the phosphate mineral escape with the steam during the concentration process. For this reason, the vapors cannot be released directly into the atmosphere, and instead fluoride components must first be removed therefrom; it is desirable that these fluorine compounds should be obtained in a very concentrated, and commercially useful, form. In the vapor phase, the fluorine compounds are present as hydrogen fluoride and silicon tetrafluoride in the approximate molar ratio of 2:1. When these pass into the liquid phase, aqueous solutions of fluosilicic acid are formed.

A plurality of processes for recovery of the fluorine compounds contained in the vapors obtained when evaporatively concentrating phosphoric acid have been disclosed.

For example, according to U.S. Pat. No. 4,106,918 the vapors are condensed in two stages, the main part of the steam and of the fluorine compounds contained therein being precipitated in the first stage. Whilst the condensate obtained in the second stage has a very low fluorine concentration of <0.1 ppm, the main part of the condensate, obtained in the first stage, has a fluorine content of about 2% by weight. This content is on the one hand too high to allow the condensate to be run to waste, whilst on the other hand it is to low for commercial utilization of the fluorine compounds contained therein.

In the process described in U.S. Pat. No. 3,091,513, the recovery of the fluorine compounds is effected without excessive production of water of condensation. The essential feature of this process is that the fluorine-containing vapors are brought into contact with a liquid which absorbs fluorine compounds, at a temperature such that whilst the fluorine compounds are absorbed, condensation of water contained in the vapors is substantially avoided. The solutions obtained may contain from 5 to 28% by weight of $H_2SiF_6$. At concentrations of about 15% by weight of $H_2SiF_6$ in the absorption solution, from about 90 to 95% of the fluorine compounds contained in the vapors are removed. However, the degree of removal decreases greatly with increasing concentration of the absorption solution. This means, in other words, that at low $H_2SiF_6$ concentrations in the absorption solution the process ensures adequate removal of the fluorine compounds from the vapors, but that isolation of the fluorine compounds from the absorption solutions is very expensive because of their low concentration. On the other hand, at higher $H_2SiF_6$ concentrations it is commercially possible to isolate the fluorine compounds, but the degree of removal of the fluorine compounds from the vapors is then unsatisfactory.

It is an object of the present invention to provide a process for isolating fluorine compounds from the vapors obtained when evaporatively concentrating phosphoric acid, by scrubbing the vapors with an aqueous solution of fluosilicic acid under reduced pressure and at a temperature which is sufficiently high that steam condensation virtually does not occur, and recovering an aqueous solution of fluosilicic acid, wherein both high $H_2SiF_6$ concentrations in the absorption solution and a high degree of removal of the fluorine compounds from the vapors are achieved.

We have found that this object is achieved if the aqueous solution of fluosilicic acid is injected at a speed of from 15 m/s to 40 m/s into the upper part of a scrubbing zone and finely divided over the entire cross-section of the said zone, and the vapors are passed through the scrubbing zone at a speed of from 5 m/s to 30 m/s, in co-current with the aqueous fluosilicic acid solution, the residence time being from 0.4 to 1.5 s.

As a result of the vapors and the finely divided aqueous fluosilicic acid solution being passed, in accordance with the invention, in co-current through the scrubbing zone, a large material exchange surface between the vapor and liquid results, whilst due to the impulse exchange an increase in pressure in the scrubbing zone, in the direction of flow, results. This makes it possible to employ particularly efficient mist collectors at the end of the scrubbing zone, without the temperature in the downstream injection condensers having to fall below the conventional values.

This further makes it possible, when using several scrubbing zones in series, to minimize entrainment of droplets from one scrubbing zone into the next, thereby also contributing to an improvement in the scrubbing efficiency of each scrubbing stage.

The aqueous fluosilicic acid solutions are preferably injected at a speed of from 20 to 30 m/s. The speed with which the vapors are passed through the scrubbing zone is preferably from 15 to 25 m/s, whilst the residence time is preferably from 0.6 to 1 s.

The resulting aqueous fluosilicic acid solutions, a part of which is preferably recycled, contain from 20 to 28% by weight of $H_2SiF_6$.

In the scrubbing zone, pressures of from 60 to 100 mbar and temperatures of from 40° to 60° C. are employed, the precise value depending on the conditions during the evaporative concentration. In each case, the temperature is chosen in accordance with the pressure so that virtually no condensation of water occurs.

Using the process according to the invention, absorption solutions are obtained which contain from about 20 to 28% by weight of $H_2SiF_6$ and which, because of their high concentration, are economical to process further. At the same time, the absorption yields achieved in practice are very close to the theoretical yields. For example, in a two-stage absorption, the theoretical total yield is 99.5% and the total yield in practice is in every case substantially above 95%. At the same time, the fluorine contents in the injection condensers provided at the end of the process sequence are less than 50 mg of F/l, though here the theoretical minimum amount of injected water and the conventional cooling water temperature suffice.

The drawing sets forth in schematic form apparatus that can be used in carrying out the process.

The Example which follows illustrates the process according to the invention.

EXAMPLE

A fluoride-containing dilute phosphoric acid is introduced through line 1 into an evaporator 2, where it is concentrated under an absolute pressure of 80 mbar, at 75° C., to a concentrated acid which is taken from the evaporator through line 3. The vapors taken off through line 4 contain 3.2% by weight of fluorine in the form of $SiF_4$ and HF vapor. In the mist collector 5, entrained phosphoric acid is removed and is then returned, through the connecting line 6, to the evaporator 2.

The vapors, from which phosphoric acid has been removed, flow through line 7 into the first co-current scrubber 8, through which they pass at a speed of 20.7 m/s. There, they come into contact with finely divided fluosilicic acid solution containing 25% by weight of $H_2SiF_6$, which is injected into the scrubber at a speed of 25 m/s. The temperature in the scrubber is 48° C. The fluosilicic acid solution, together with the vapors, whose residence time in the scrubber is 0.8 s, leave the scrubber 8 via the connecting pipe 9 and enter the mist collector 10, where they are separated into vapor and liquid. The fluosilicic acid flows back to the scrubber 8 in a closed circuit, via line 11, pump 12 and line 13.

From this circuit, a 25% strength by weight fluosilicic acid is taken off, through line 14, in an amount corresponding to the fluosilicic acid formed in the scrubber 8, whilst 8% strength by weight fluosilicic acid flows in from the second scrubbing stage through line 15.

The vapors which leave the separator 10 through line 16 contain 0.99% by weight of fluorine, including entrained fluosilicic acid mist, and enter the second scrubbing stage, consisting of the co-current scrubber 17 and the mist collector 19, the liquid being circulated through lines 18, 20 and 22 by means of the pump 21. The scrubber 17 is run under the same conditions as the scrubber 8, apart from the fluosilicic acid concentration in the wash solution.

At 23, fresh water, or a part of the waste water drawn off through line 27, enters this scrubbing circuit via a liquid level control device, in an amount corresponding to the 8% strength by weight acid transferred to the first scrubbing stage via line 15.

The vapors which leave the separator 19 through line 24 contain 0.09% by weight of fluorine, including entrained fluosilicic acid mist. These vapors are precipitated in the injection condenser 25 by means of cooling water (at 25° C.) introduced through line 26, and are drawn off through line 27. The concentration in the waste water is 30 mg of F/1. Inert gases are drawn off through line 28 by means of a vacuum unit.

Essential advantages of this arrangement result through the scrubbers 8 and 17, which are operated in co-current, and which on the one hand, through permitting very fine distribution of the liquid, make it possible to have a large material exchange surface between vapor and liquid, whilst, on the other hand, an increase in pressure in the scrubbers is achieved through impulse exchange. With a liquid/vapor flow rate ratio of 33, and a nozzle input pressure $p_{abs}$ of 4.0 bar, the absolute pressure set up in line 9 is 75.5 mbar, as against 72 mbar in line 7, ie. there is a pressure gain of 3.5 mbar. The situation in the scrubber 17 is similar, with 68 mbar in the upper part and 71.5 mbar in the lower part.

This pressure gain in the scrubber makes it possible to employ particularly efficient mist collectors 10 and 19, so that entrainment of liquid by the vapor from the first scrubbing stage into the second scrubbing stage is virtually impossible. The amount of liquid entrained with the vapors taken off through line 16 is about 1.8%, based on the amount of liquid entering through line 15. For comparison, the values when using conventional column packings is of the order of about 10%. This low rate of entrainment contributes substantially to the high degree of depletion in fluorine which is achievable per scrubbing stage, namely 90% of theory, corresponding to a total depletion, or total yield, of about 97%.

Since the pressure gain in the scrubbers 8 and 17 largely compensates the pressure loss in the mist collectors 10 and 19 respectively, this process can be employed under pressure conditions which are predetermined, on one side, by the evaporative concentration 2 of the phosphoric acid, and, on the other side, by the water temperature in the condenser 25. The absolute pressure are 80 mbar for evaporation and 65 mbar for condensation.

We claim:

1. A process for removing fluorine compounds from the vapors that are obtained when phosphoric acid is evaporatively concentrated which comprises:

injecting an aqueous solution of about 20–28% by weight of fluosilicic acid into the upper part of a first scrubbing zone at a speed of from 15 m/s to 40 m/s under a reduced pressure of from 60–100 mbar and at a temperature at which condensation of steam is substantially avoided, said injected aqueous solution being finely divided over the entire cross section of the zone;

passing said vapors from which fluorine compounds are to be removed through said first scrubbing zone at a speed of from 5 m/s to 30 m/s in co-current with the aqueous fluosilicic acid solution, the residence time of said vapors being from 0.4 to 1.5 seconds;

passing the mixture of liquid and vapors from the first scrubbing zone to a first demisting zone where the liquid and vapors are separated, an aqueous solution of fluosilicic acid having a concentration of from 20 to 28% by weight being recovered from said demisting zone;

recycling a portion of said recovered aqueous solution of fluosilicic acid to the frst scrubbing zone;

injecting an aqueous solution of fluosilicic acid into the upper part of a second scrubbing zone at a speed of from 15 m/s to 40 m/s under a reduced pressure of from 60–100 mbar and at a temperature at which condensation of steam is substantially avoided, said aqueous solution being finely divided over the entire cross-section of the zone;

passing the vapors from the first demisting zone through said second scrubbing zone at a speed of from 5 m/s to 30 m/s in co-current with the aqueous fluosilicic acid solution, the residence time of said vapors being 0.4 to 1.5 seconds;

passing the mixture of liquid and vapors from the second scrubbing zone to a second demisting zone where the liquid and vapors are separated, an aqueous solution of fluosilicic acid being recovered from said demisting zone; and recycling a portion of said recovered aqueous solution of fluosilicic acid to the second scrubbing zone.

2. The process of claim 1, wherein the aqueous fluosilicic acid solutions are injected into the scrubbing zones at a speed of from 20 to 30 m/s.

3. The process of claim 1, wherein the vapors are passed through the scrubbing zones at a speed of from 15 to 25 m/s.

4. The process of claimed 1, wherein the residence time of the vapors in each of the scrubbing zones is from 0.6 to 1 s.

* * * * *